(12) United States Patent
Bowen et al.

(10) Patent No.: US 9,779,752 B2
(45) Date of Patent: Oct. 3, 2017

(54) ACOUSTIC ENHANCEMENT BY LEVERAGING METADATA TO MITIGATE THE IMPACT OF NOISY ENVIRONMENTS

(71) Applicant: AT&T Intellectual Property I, L.P., Atlanta, GA (US)

(72) Inventors: Donald J. Bowen, Madison, NJ (US); Dimitrios B. Dimitriadis, Rutherford, NJ (US); Lusheng Ji, Randolph, NJ (US); Horst J. Schroeter, New Providence, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 146 days.

(21) Appl. No.: 14/530,017

(22) Filed: Oct. 31, 2014

(65) Prior Publication Data

US 2016/0125892 A1    May 5, 2016

(51) Int. Cl.
*G10L 21/00* (2013.01)
*G10L 21/0208* (2013.01)
*G10L 15/20* (2006.01)

(52) U.S. Cl.
CPC .......... *G10L 21/0208* (2013.01); *G10L 15/20* (2013.01)

(58) Field of Classification Search
CPC .................................................. G10L 21/0208
USPC .................................................. 704/226, 233
See application file for complete search history.

(56) References Cited

U.S. PATENT DOCUMENTS

| | | |
|---|---|---|
| 5,799,276 A | 8/1998 | Komissarchik et al. |
| 6,418,411 B1 | 7/2002 | Gong |
| 6,934,756 B2 | 8/2005 | Maes |
| 7,457,750 B2 | 11/2008 | Rose et al. |
| 7,725,316 B2 | 5/2010 | Chengalvarayan et al. |
| 8,121,837 B2 | 2/2012 | Agapi et al. |

(Continued)

OTHER PUBLICATIONS

Sangwan et al., "VAD techniques for real-time speech transmission on the Internet," High Speed Networks and Multimedia Communications 5th IEEE International Conference, IEEE, 2002, http://www.researchgate.net/publication/3966834_VAD_techniques_for_realtime_speech_transmission_on_the_Internet/file/9fcfd505b797ddedaa.pdf.

(Continued)

*Primary Examiner* — Shaun Roberts
(74) *Attorney, Agent, or Firm* — Akerman LLP; Michael K. Dixon; Mammen (Roy) P. Zachariah, Jr.

(57) ABSTRACT

A system for cloud acoustic enhancement is disclosed. In particular, the system may leverage metadata and cloud-computing network resources to mitigate the impact of noisy environments that may potentially interfere with user communications. In order to do so, the system may receive an audio stream including an audio signal associated with a user, and determine if the audio stream also includes an interference signal. The system may determine that the audio stream includes the interference signal if a portion of the audio stream correlates with metadata that identifies the interference signal. If the audio stream is determined to include the interference signal, the system may cancel the interference signal from the audio stream by utilizing the metadata and the cloud-computing network resources. Once the interference signal is cancelled, the system may transmit the audio stream including the audio signal associated with the user to an intended destination.

20 Claims, 8 Drawing Sheets

(56) References Cited

U.S. PATENT DOCUMENTS

| | | | |
|---|---|---|---|
| 8,145,481 B2 | 3/2012 | Gajic et al. | |
| 8,364,477 B2 | 1/2013 | Song et al. | |
| 8,416,959 B2 | 4/2013 | Lott et al. | |
| 8,571,859 B1 | 10/2013 | Aleksic et al. | |
| 8,600,746 B1 | 12/2013 | Lei et al. | |
| 8,645,128 B1 | 2/2014 | Agiomyrgiannakis | |
| 8,694,306 B1 | 4/2014 | Short et al. | |
| 8,699,674 B2 | 4/2014 | Bouzid et al. | |
| 8,700,392 B1* | 4/2014 | Hart | G10L 15/25 704/231 |
| 8,700,393 B2 | 4/2014 | Aleksic et al. | |
| 8,719,017 B2 | 5/2014 | Rose et al. | |
| 2003/0064746 A1* | 4/2003 | Rader | H04R 25/70 455/550.1 |
| 2004/0142672 A1* | 7/2004 | Stankewitz | H04M 1/19 455/296 |
| 2009/0290718 A1* | 11/2009 | Kahn | H03G 3/32 381/57 |
| 2010/0020940 A1* | 1/2010 | Zad-Issa | H04M 1/24 379/32.01 |
| 2010/0063809 A1* | 3/2010 | Trump | H04M 9/082 704/228 |
| 2011/0066427 A1* | 3/2011 | Konchitsky | G10L 21/0208 704/219 |
| 2011/0153620 A1 | 6/2011 | Coifman | |
| 2011/0224979 A1* | 9/2011 | Raux | G10L 15/07 704/233 |
| 2012/0016671 A1 | 1/2012 | Jaggi et al. | |
| 2013/0225128 A1 | 8/2013 | Gomar | |
| 2013/0287135 A1 | 10/2013 | Cheng et al. | |
| 2013/0343584 A1 | 12/2013 | Bennett et al. | |
| 2014/0025374 A1 | 1/2014 | Lou | |
| 2014/0025377 A1 | 1/2014 | Koch et al. | |
| 2014/0025380 A1 | 1/2014 | Koch et al. | |
| 2015/0012267 A1* | 1/2015 | Rill | G10L 15/20 704/233 |
| 2016/0019904 A1* | 1/2016 | Charette | G10L 21/0205 704/227 |

OTHER PUBLICATIONS

Spanias et al., "Development and evaluation of a web-based signal and speech processing laboratory for distance learning," Acoustics, Speech, and Signal Processing, 2000. ICASSP'00 Proceedings, 2000 IEEE International Conference, vol. 6., 2000. http://spanias.faculty.asu.edu/icassp2000.pdf.

Hoene et al., "A perceptual quality model for adaptive VoIP applications," Proceedings of SPECTS, vol. 4, 2004, http://typo3.cs.uni-paderborn.de/fileadmin/Informatik/AG-Karl/Publications/hoene_07_2004_paper.pdf.

Davis, "Noise reduction in speech applications," vol. 7. CRC Press, 2002, http://www.bth.se/fou/forskinfo.nsf/all/a2b5f7d73716e960c1256c6a003e0f8e/$file/2002-BookChptr-NRSA-LHA-SJO-MDA-PSJ-ICL_part1.(odd_pages).pdf.

Li et al. "Robust endpoint detection and energy normalization for real-time speech and speaker recognition," Speech and Audio Processing, IEEE Transactions on 10.3 (2002), pp. 146-157. http://www.researchgate.net/publication/3333862_Robust_endpoint_detection_and_energy_normalization_for_realtimespeech_and_speaker_recognition/file/e0b495231dfd45621f.pdf.

\* cited by examiner

ACOUSTIC ENHANCEMENT BY LEVERAGING METADATA TO MITIGATE THE IMPACT OF NOISY ENVIRONMENTS

FIELD OF THE INVENTION

The present application relates to technologies for noise suppression, speech enhancement, and cloud-computing, and more particularly, to a system and method for providing cloud acoustic enhancement.

BACKGROUND

In today's society, end users regularly utilize smartphones, speech recognition systems, and other audio-based technologies to place and receive phone calls, access various types of internet services, and perform a variety of functions, or a combination thereof. When an end user communicates using such devices and technologies, the end user may be located in an environment that may not provide for optimal communication conditions. Such environments may include ambient noise, which may pose substantial challenges when end users attempt to communicate with others or with automatic speech recognition systems. In recent years, these challenges have only been exacerbated based on a number of trends. In particular, there has been a large migration away from traditional handset designs towards rectangular-shaped smartphones, which are inferior to traditional handset designs at coupling a talker's voice to the microphone of the smartphone. Additionally, an increasing number of end users are using speakerphones on both wired and wireless platforms, which admit substantial amounts of background noise relative to the talker's voice. Furthermore, there has been an increasing number of end users that are using smartphones in noisy environments, a greater societal acceptance of taking calls in the presence of others engaged in noisy activities, and an increasing use of automated speech recognition systems to interact with local and network resources.

In order to counteract the ambient noise existing in an end user's environment, traditional solutions typically involve brute-force processing, in isolation, of all of the various audio information occurring in the environment. Such brute-force processing often requires extensive use of limited network resources, causes communication delays, increases power usage, and increases network and other costs. While some currently existing solutions utilize noise suppression algorithms and technologies to separate a selected end user's audio signals from the ambient noise in the environment, such noise suppression algorithms and technologies often do so only by predefining the locations of the sources of the ambient noise and the location of the selected end user.

SUMMARY

A system and accompanying methods for providing cloud acoustic enhancement are disclosed. In particular, the system and methods may enhance a user's audio experiences by utilizing metadata associated with the user's desired audio stream, metadata associated with the user's environment, sensor data, and cloud-computing network resources to mitigate the impact of noisy conditions that may potentially interfere with the user's communications. In order to accomplish this, the system and methods may receive and analyze an audio stream including an audio signal associated with a particular user. As the audio stream is being received or at another selected time, the system and methods may determine, by utilizing a cloud-computing network, if the audio stream includes an interference signal that may potentially interfere with the user's communications. The system and methods may determine that the audio stream includes the interference signal if a portion of the audio stream is determined to correlate with metadata that identifies the interference signal.

If the audio stream is determined to include the interference signal, the system and methods may utilize various noise suppression algorithms and techniques to cancel or suppress the detected interference signal from the audio stream. In certain embodiments, the system and methods may utilize the metadata, noise profiles correlating with the interference signal, noise profiles associated with the user's environment and device, and the cloud-computing network to assist in the cancelling the interference signal from the audio stream. Once the effects of the interference signal are suppressed or cancelled from the audio stream, the system and methods may transmit the audio stream including the desired audio signal associated with the user to an intended destination. For example, the audio stream may be sent to a device of a caller communicating with the user, to an automatic speech recognition system that the user is using, to any other destination, or any combination thereof. Thus, the system and methods effectively leverage metadata and other information about the acoustic environment that the user is immersed in, along with cloud-computing resources, to dramatically improve end-to-end audio clarity and performance.

In one embodiment, a system for providing cloud acoustic enhancement is disclosed. The system may include a memory that stores instructions and a processor that executes the instructions to perform various operations of the system. Additionally, the system may perform any of the operations of the system by utilizing the resources of a cloud-computing network. The system may perform an operation that includes receiving an audio stream including an audio signal associated with a user. Once the audio stream is received, the system may perform an operation that includes determining if the audio stream includes an interference signal in addition to the audio signal associated with the user. The system may determine that the audio stream includes the interference signal if a portion of the audio stream correlates with metadata that identifies the interference signal. The system may then perform an operation that includes cancelling, if the audio stream is determined to include the interference signal, the interference signal from the audio stream. Notably, the interference signal may be cancelled from the audio stream by utilizing the metadata. After the interference signal is cancelled from the audio stream, the system may perform an operation that includes transmitting the audio stream including the audio signal associated with the user to an intended destination.

In another embodiment, a method for providing cloud acoustic enhancement is disclosed. The method may include utilizing a memory that stores instructions, and a processor that executes the instructions to perform the various functions of the method. Additionally, the method may be performed by utilizing the resources of a cloud-computing network. The method may include receiving an audio stream including an audio signal associated with a user. Additionally, the method may include determining if the audio stream includes an interference signal in addition to the audio signal associated with the user. The audio stream may be determined to include the interference signal if a portion of the audio stream correlates with metadata that identifies the interference signal. The method may also include cancelling the interference signal from the audio stream if the audio stream is determined to include the interference signal. The interference signal may be cancelled from the audio stream by utilizing the metadata. Furthermore, after cancelling the interference signal, the method may include transmitting the audio stream including the audio signal associated with the user to an intended destination.

According to yet another embodiment, a computer-readable device having instructions for providing cloud acoustic enhancement is provided. The computer instructions, which when loaded and executed by a processor, may cause the processor to perform operations including: receiving an audio stream including an audio signal associated with a user; determining if the audio stream includes an interference signal in addition to the audio signal associated with the user, wherein the audio stream is determined to include the interference signal if a portion of the audio stream correlates with metadata that identifies the interference signal; cancelling, if the audio stream is determined to include the interference signal, the interference signal from the audio stream, wherein the interference signal is cancelled from the audio stream by utilizing the metadata; and transmitting, after cancelling the interference signal, the audio stream including the audio signal associated with the user to an intended destination.

These and other features of the systems and methods for providing cloud acoustic enhancement are described in the following detailed description, drawings, and appended claims.

DETAILED DESCRIPTION OF THE INVENTION

Figure 1:
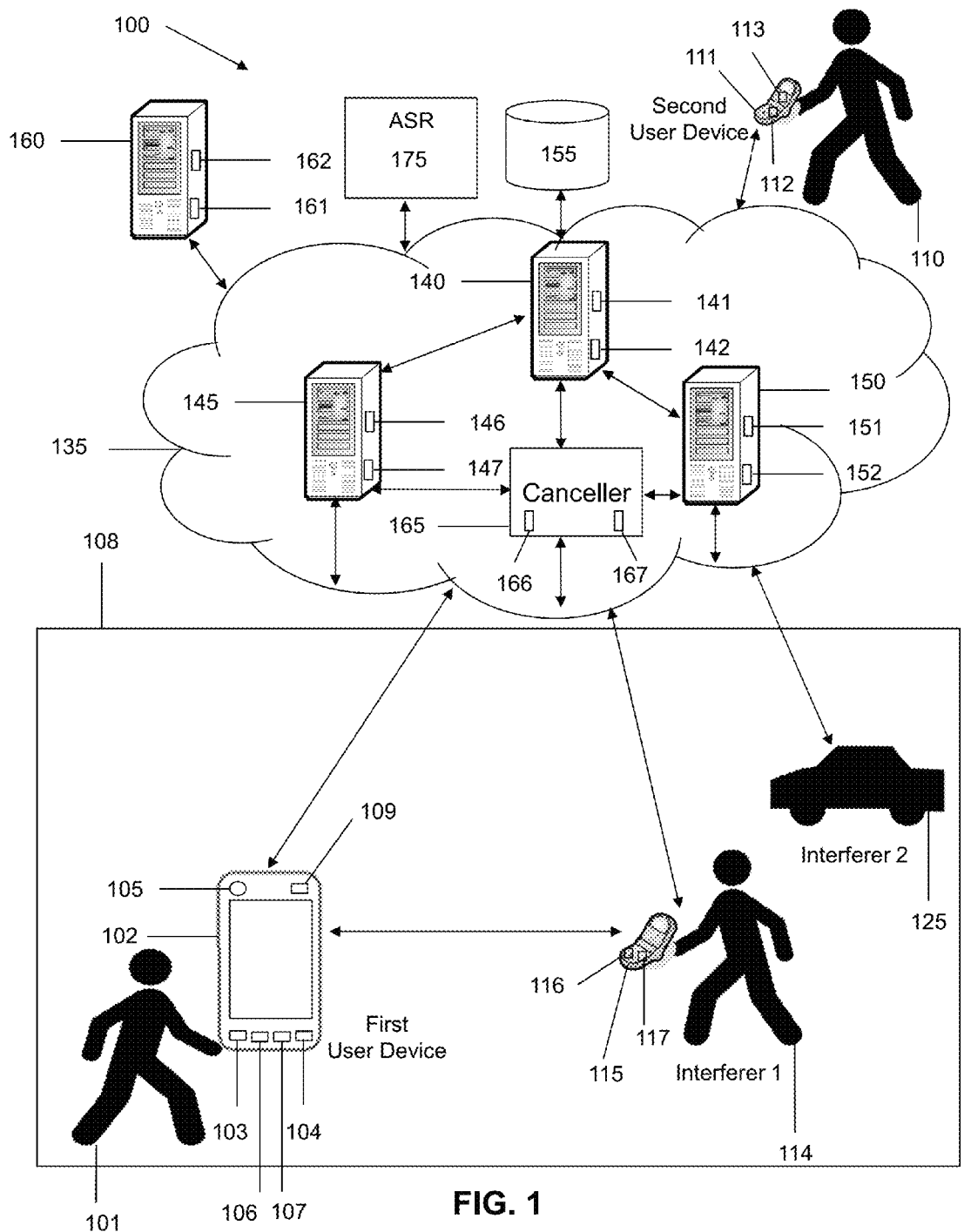
FIG. 1 is a schematic diagram of a system for providing cloud acoustic enhancement according to an embodiment of the present disclosure.

A system 100 and accompanying methods for providing cloud acoustic enhancement are disclosed, as shown in FIGS. 1-8. In particular, the system 100 and methods may utilize cloud-computing network resources and metadata associated various environments, media content, noise sources, devices, users, and other sources to improve the speed and efficiency of noise suppression and cancellation algorithms used in enhancing various types of communications sessions. In order to accomplish this, the system 100 and methods may receive and analyze an audio stream including an audio signal associated with a particular user, such as first user 101. As the audio stream is being received or at another selected time, the system 100 and methods may determine, by utilizing a cloud-computing network, if the audio stream includes an interference signal that may potentially interfere with the user's communications. The system 100 and methods may determine that the audio stream includes the interference signal if a portion of the audio stream is determined to correlate with metadata that identifies the interference signal.

Notably, if the audio stream is determined to include the interference signal, the system 100 and methods may utilize various noise suppression algorithms and techniques to cancel the detected interference signal from the audio stream. In certain embodiments, the system 100 and methods may utilize the metadata, noise profiles correlating with the interference signal, noise profiles associated with the user's environment 108 and device, and the cloud-computing network to assist in the cancelling the interference signal from the audio stream. Once the effects of the interference signal are suppressed or cancelled from the audio stream, the system 100 and methods may transmit the audio stream including the desired audio signal associated with the user to an intended destination. As an example, the audio stream may be sent to second user device 111 of second user 110 who is communicating with the user, to an automatic speech recognition system 175 that the user is interacting with, to any other destination, or any combination thereof. Thus, the system 100 and methods utilize metadata and other information about the environment 108 that the user is immersed in, along with cloud-computing resources, to dramatically enhance end-to-end audio communications.

As shown in FIG. 1, a system 100 for providing cloud acoustic enhancement is disclosed. The system 100 may be configured to support, but is not limited to, supporting, cloud computing services, content delivery services, automatic speech recognition services, telephone services, voice-over-internet protocol services (VoIP), software as a service (SaaS) applications, gaming applications and services, productivity applications and services, mobile applications and services, and any other computing applications and services. The system may include a first user 101 that may utilize first user device 102 to access content, data, and services, to initiate and participate in communications sessions or to perform a variety of other functions. For example, the first user 101 may utilize first user device 102 to establish and handle a communications session, such as a telephone call or a chat session, with a second user 110 that may be utilizing second user device 111.

In certain embodiments, the first user device 102 and second user device 111 may be computers, servers, mobile devices, smartphones, computer tablets, phablets, or any other computing devices. In one embodiment, the first user device 102 may include a memory 103 that includes instructions, and a processor 104 that executes the instructions from the memory 103 to perform various operations that are performed by the first user device 102. The processor 104 may be hardware, software, or a combination thereof. Additionally, the first user device 102 may include a camera 105, which may be utilized to capture video, image, or other content. Furthermore, the first user device 102 may also include an accelerometer 106 that may be utilized to measure a rate of acceleration of the first user device 102. In certain embodiments, the rate of acceleration may be utilized by the device 102 to determine an orientation of the first user device 102, along with a gyroscope 109. Furthermore, the first user device 102 may include a global positioning sensor 107 that may provide location information for the first user device 102 and location information for the first user 101 that is using the first user device 102. The second user device 111 may include a memory 112 that includes instructions, and a processor 113 that executes the instructions from the memory 112 to perform various operations that are performed by the second user device 111. The processor 113 may be hardware, software, or a combination thereof.

The first user 101 and the second user 110 may utilize the first user device 102 and second user device 111, respectively, to engage in communications sessions and to access and obtain various types of content and services, such as, but not limited to, video content, audio content, web content, text content, automatic speech recognition services, and other speech-related services. Additionally, the first and second users 101, 110 may utilize the first and second user devices 102, 111 to perform a variety of other tasks and functions. In certain embodiments, the first user device 102 and second user device 111 may include a software application that may be an automatic speech recognition application, a cloud-based application, gaming application, an internet-based application, a browser application, a mobile application, a productivity application, a video application, a music application, a social media application, a financial application, a news application, any other type of application, or a combination thereof. In certain embodiments, the application may be utilized to provide de-noising services to the first and second users. In certain embodiments, at least a portion of the software application may be configured to execute directly on the first user device 102 and second user device 111, however, in other embodiments, the software application may be configured to execute on the other devices and components in the system 100.

The first user 101 of the first user device 102 may be located in an environment 108, which may be any type of environment, such as, but not limited to, a street, a stadium, an airport, a park, an office building, a vehicle, a body of water, a movie theater, or any other type of environment. In certain embodiments, the second user 110 may be located in the same environment 108 as the first user 101, however, in other embodiments, the second user 110 may be located in a different environment from the first user 101. In FIG. 1, the second user 110 is illustratively shown as not being located in the same environment 108 as the first user 101. The environment 108 may include ambient noise generated by one or more interferers, such as, but not limited to, interferer 114 and interferer 125. The interferers 114, 125 may be any type of object, person, or animal that may make noise in the environment 108 that may potentially interfere with communications made by the first user 101, the second user 110, or both. Illustratively, in FIG. 1, the interferer 114 is an interfering user that is using an interfering device 115, such as a smartphone, that includes a memory 116 that stores instructions and a processor 117 that executes the instructions to perform the various operations of the interfering device 115. Interferer 125 is illustratively shown in FIG. 1 as a vehicle. In certain embodiments, the environment 108 may also include noise generated by any other type of noise source as well.

The system 100 may also include a canceller 165, which may be utilized to cancel, or otherwise suppress, interference signals or other undesired audio signals so as to enhance communications made by the first user 101, the second user 110, or both. The canceller 165 may include a memory 166 that includes instructions, and a processor 167 that executes the instructions from the memory 166 to perform various operations that are performed by the canceller 165. The processor 167 may be hardware, software, or a combination thereof. The canceller 165 may reside within the communications network 135, which may be a cloud-computing network. In certain embodiments, the canceller 165 may be configured to store noise suppression, echo-cancellation, and other algorithms that enable the canceller 165 to cancel interference signals occurring in the system 100. In other embodiments, the canceller 165 may not store the noise suppression algorithms on the canceller 165 itself, but, instead, may access the algorithms from the database 155. The canceller 165 may receive audio streams including desired audio signals and undesired interference signals occurring in the system 100. Upon receiving such audio streams, the canceller 165 may utilize metadata, noise profiles, sensor data, and other information associated with the interference signals and the desired audio signals to suppress the undesired interference signals.

Additionally, the system 100 may include an automatic speech recognition system 175. The automatic speech recognition system 175 may be configured to receive audio inputs, such as, but not limited to, voice inputs, tone inputs, music inputs, or any other type of audio input. In certain embodiments, the automatic speech recognition system 175 may be configured to translate audio inputs into text, perform a variety of commands based on the audio inputs, or perform any other automatic speech recognition functions. The automatic speech recognition system 175 may reside within or outside the communications network 135, and may be communicatively linked with any of the devices in the system 100. In certain embodiments, the automatic speech recognition system 175 may be configured to receive audio streams directly from any of the devices in the system 100, however, in certain embodiments, the automatic speech recognition system 175 may be configured to only receive audio streams after they have been processed by the canceller 165 or by another device in the system 100 that may perform noise suppression services on the audio streams.

The functionality of the system 100 may be supported and executed by using any combination of the servers 140, 145, and 150 in the communications network 135 or outside of the communications network 135. In one embodiment, the server 140 may include a memory 141 that includes instructions, and a processor 142 that executes the instructions from the memory 141 to perform various operations that are performed by the server 140. Additionally, the server 145 may include a memory 146 that includes instructions, and a processor 147 that executes the instructions from the memory 146 to perform various operations that are performed by the server 145. Furthermore, the server 150 may include a memory 151 that includes instructions, and a processor 152 that executes the instructions from the memory 151 to perform various operations that are performed by the server 150. The processors 142, 147, and 152 may be hardware, software, or a combination thereof. In certain embodiments, the servers 140, 145, and 150 may be network servers, routers, gateways, computers, mobile devices or any other suitable computing device.

The communications network 135 of the system 100 may be configured to link each of the devices in the system 100 to one another, and be configured to transmit, generate, and receive any information and data traversing the system 100. In one embodiment, the communications network 135 may include any number of additional servers in addition to the server 140, the server 145, and the server 150. The communications network 135 may also include and be connected to a cloud-computing network, a wireless network, an ethernet network, a satellite network, a broadband network, a cellular network, a private network, a cable network, the Internet, an internet protocol network, a multiprotocol label switching (MPLS) network, a content distribution network or any combination thereof. In one embodiment, the communications network 135 may be part of a single autonomous system that is located in a particular geographic region, or be part of multiple autonomous systems that span several geographic regions. The phone network 136 shown in FIG. 5 may be any type of phone network that may include, but is not limited to, a public switched telephone network, a VoIP network, any other type of phone network, or any combination thereof. In certain embodiments, that phone network 136 may be configured to reside within the communications network 135.

The database 155 of the system 100 may be utilized to store and relay information that traverses the system 100, cache content that traverses the system 100, store data about each of the devices in the system 100 and perform any other typical functions of a database. In one embodiment, the database 155 may be connected to or reside within the communications network 135, the phone network 136, or any combination thereof. Additionally, the database 155 may include a processor and memory or be connected to a processor and memory to perform the various operation associated with the database 155. In certain embodiments, the database 155 may be connected to servers 140, 145, and 150, server 160, first user device 102, second user device 111, the canceller 165, the automatic speech recognition system 175, the audio device 205, the broadcast device 305, the television device 405, the local noise source 605, or any combination thereof. The database 155 may also store the content and metadata obtained from the environment 108, store metadata associated with the first and second users 101, 110, store user profiles and audio profiles, store location information, store communications, store information about the interferers 114, 125, store noise profiles for the interferers 114, 125 and the interfering device 115, store user preferences, store noise cancellation and suppression algorithms, store metadata associated with the interference signals, store metadata associated with desired audio signals, store metadata associated with any device or signal in the system 100, store historical user usage pattern information, store any information traversing the system 100, or any combination thereof. Furthermore, the database 155 may be configured to process queries sent to it by any device in the system 100.

The user database 156 may be connected to or reside within database 155. In certain embodiments, the user database 156 may be configured to store metadata associated with the first and second users 101, 110, store user profiles for the first and second users 101, 110, store location information for the users 101, 110, store communications made by the users 101, 110, store information about the interferers 114, 125, store user profiles for the interferer 114, store user preferences for each of the users 101, 110, store noise cancellation and suppression algorithms, store historical user usage pattern information for each of the users 101, 110, store any information traversing the system 100, or any combination thereof. Similarly, the music database 157 may be connected to or reside within database 155. In certain embodiments, the music database 157 may store metadata identifying or otherwise associated with music content, noise cancellation algorithms and information for canceling interference signals containing such music content, user preferences associated with music content, store any information traversing the system 100, or any combination thereof.

Operatively, the system 100 may improve user communications through the use of cloud acoustic enhancement. In a first example scenario, as shown in FIG. 1, the first user 101 of the first user device 102 may be engaging in a communications session, such as a telephone call, with the second user 110 of the second user device 111. Additionally, the first user 101 may be engaged in a speech recognition session with the automatic speech recognition system 175. In this example, the environment 108 may be a busy street that includes ambient noise, such as noises made by interferers 114, 125, that may potentially interfere with the quality and perceptibility of the communications occurring during the communications session between the first and second users 101, 110 and during the speech recognition session between the first user 101 and the automatic speech recognition system 175. In order to counteract such interfering noises in the environment 108, the first user 101 may begin speaking through the first user device 102, and any detected audio inputs, including the speech, may be converted into an audio stream by the first user device 102. The audio stream may then be transmitted by the first user device 102 to the communications network 135 and ultimately to the canceller 165 for further processing.

Once the audio stream is received from the first user device 102, the system 100 may access metadata, noise profiles, user profiles, location profiles, and other data to assist in determining whether one or more interference signals exist in the audio stream. Additionally, the system 100 may harvest additional metadata and information associated with the first user 101, the first user device 102, the environment 108, the interferers 114, 125, the second user 110, or any of the other devices in the system 100 in real-time so as to supplement any previously existing metadata and profiles or to create new metadata and profiles. The harvested metadata may be predictive information that may assist in detecting and cancelling interference signals. The metadata may be harvested and extracted from visual content obtained from the camera 105, acceleration data captured by the accelerometer 106, orientation data captured using the gyroscope 109, location data captured by the global positioning sensor 107, data obtained by any of the devices in the system 100, or any combination thereof. The metadata may include, but is not limited to, information that indicates a location of the first user 101, information for identifying interference signals, information for cancelling interference signals through the use of noise suppression algorithms and echo-cancellation techniques, information that indicates what the interferers 114, 125 are, information that indicates the locations of the interferers 114, 125, information for identifying the audio signals made in the environment 108 by interferers 114, 125, information that identifies the first user 101, information that indicates what the users in the environment 108 are doing, information that indicates a type of environment 108, information that indicates the types of devices being used in the environment 108, any other type of information, or a combination thereof.

A noise profile may include, but is not limited to, audio information, signaling information, noise suppression algorithm information, noise cancellation information, or other information that corresponds to the noise conditions typically found in the environment 108. Similarly, there may be noise profiles corresponding to the interfering devices 115, 125, which may include audio information, signaling information, noise cancellation information, or other information specifically corresponding to the interfering devices 115, 125 and the noise conditions made by the interfering devices 115, 125. For example, for interfering device 115, there may be a noise profile that includes noise cancellation information and data corresponding to the audio interference signals outputted by the interfering device 115, the interferer's 114 pattern of usage as it relates to the interfering device 115, the type of the interfering device 115, any other information associated with the interfering device 115, or any combination thereof. Similarly, the interfering device 125, which in this case is a vehicle, may have its own noise profile, which includes similar types of information as stored for the interfering device 115, but which is tailored to the interfering device 125. Furthermore, the environment 108 itself may have its own noise profile, which includes similar information as stored for the interfering device 115, but which is tailored to the environment 108. For example, in FIG. 1, the environment 108 is a busy street, and the corresponding noise profile may include noise cancellation information and environmental characteristics that may be utilized in identifying and cancelling noises typically occurring on a busy street.

A user profile may be a profile corresponding to the first user 101 using the first user device 102, the interferer 114, the second user 110, or any other user. As an example, the user profile of the first user 101 may include audio information, such as, but not limited to, audio information identifying or otherwise associated with the voice of the first user 101. Additionally, the user profile may include other information associated with the first user 101, such as, but not limited to, a name of the first user 101, the age of the first user 101, demographic information associated with the first user 101, an acoustic dictionary corresponding to the first user 101, an ethnicity of the first user 101, the physical characteristics of the first user 101, and any other information. The user profile may also include information indicative of the voice characteristics of the first user 101, such as, but not limited to the accent information, tone information, pitch information, speech patterns, languages of the first user 101, or any other information associated with the speech of the first user 101. In addition to noise and user profiles, the system 100 may also include location profiles, which may include audio information, location information, noise cancellation information, or other information specific to a particular location, such as the environment 108.

Once the metadata, noise profiles, user profiles, location profiles, and other data are accessed by the system 100, the system 100, such as via the canceller 165, may utilize the metadata, noise profiles, user profiles, location profiles, and other data to effectively detect and separate each audio signal contained in the audio stream. In doing so, the system 100 may determine whether one or more interference signals exist in the audio stream in addition to the desired audio signal from the first user 101. If the system 100 determines that a portion of the audio stream correlates with metadata, profile, or other information identifying or otherwise corresponding to an interference signal, the system 100 may confirm that the portion of the audio stream is an interference signal that may be interfering with the first user's 101 desired audio signal. For example, one portion of the audio stream may correlate with interference signal information contained in a user profile associated with interferer 114, and another portion of the audio stream may correlate with an interference signal contained in a noise profile associated with the interferer 125.

After detecting an interference signal, the system 100 may then utilize the metadata, profiles, other data, or a combination thereof, to improve the efficiency and speed of noise suppression algorithms that may be utilized in cancelling the detected interference signals. For example, the canceller 165 may cancel any detected interference signals in the audio stream using the metadata, profiles, other data, and noise suppression algorithms. In certain embodiments, the canceller 165 may provide noise cancellation signals corresponding to the interference signals associated with interferers 114, 125, which may be utilized to cancel the interference signals from the audio stream to create a filtered audio stream. In certain embodiments, the interference signals may be cancelled or otherwise suppressed through the use of spatial filtering or other noise cancellation techniques.

Once the interference signals are cancelled from the audio stream, the system 100, such as via the canceller 165, may transmit the filtered audio stream to an intended destination. For example, the filtered audio stream may be transmitted to the second user device 111 so that the second user 110 may hear the desired audio signal from the first user 101 without having to experience interference from the interference signals in the original audio stream. The filtered audio stream may also be transmitted to the automatic speech recognition system 175 during the speech recognition session. In an illustrative example, the speech recognition session may be a session that the first user 101 is using to access various types of banking services. During such a session and prior to cancelling the interference signals, the automatic speech recognition functions of the automatic speech recognition system 175 may have difficulty capturing or processing the first user's voice inputs into an interface of the automatic speech recognition system 175 based on the noisy street environment 108 that the first user 101 is located in. However, once the filtered audio stream including the voice input speech of the first user 101 is transmitted to the automatic speech recognition system 175, the automatic speech recognition system's 175 ability to process the first user's 101 speech may be improved substantially. After the filtered audio stream is transmitted to the intended destination, the system 100 may include updating the metadata, the noise profiles, the user profiles, and other information in the system 100 based on the audio stream and based on the cancellation process itself. Notably, all of the operations of the processes described for the system 100 may be performed by utilizing cloud-computing network resources of the communications network 135.

Figure 2:
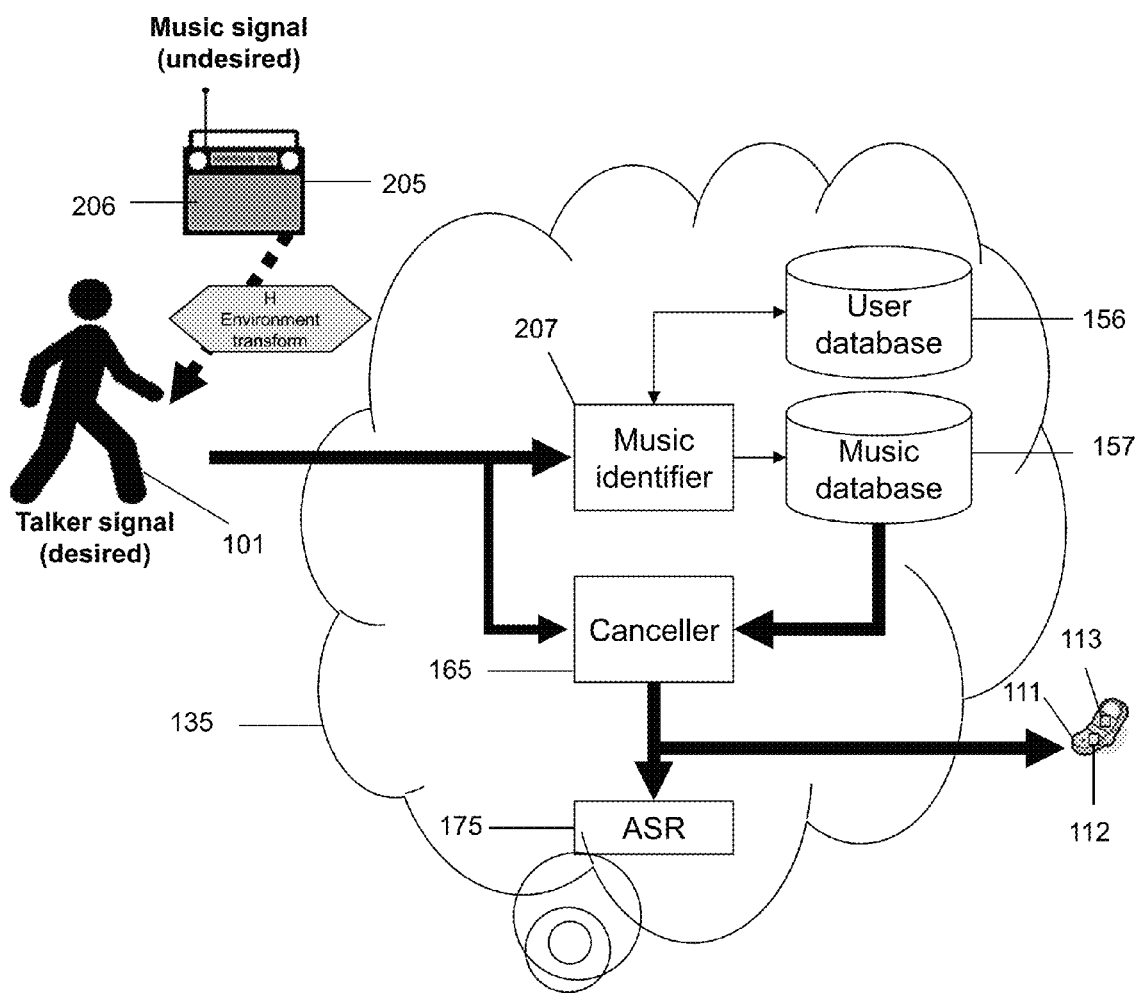
FIG. 2 is a schematic diagram illustrating a first sample scenario for using the system of FIG. 1 to cancel music or other audio signals according to an embodiment of the present disclosure.

In a second example scenario, as shown in FIG. 2, the first user 101 of the first user device 102 may be engaged in a communications session with the second user 110, who is using second user device 111. As in the previous example, the first user 101 may also be engaged in a speech recognition session with the automatic speech recognition system 175. In this example, an audio device 205 may be a potential interferer that may interfere with the communications of the first user 101. The audio device 205 may be a radio, a computer, a portable music player, or other audio device that may be configured to output music via one or more speakers 206 of the audio device 205. As the first user 101 speaks and prior to transmitting the speech to its intended destinations, the first user's 101 speech, along with any undesired background music outputted by the audio device 205 while the first user 101 is speaking, may be transmitted to the communications network 135 in an audio stream to be processed using the cloud-computing resources of the communications network 135.

Based on speech characteristics correlating to the first user 101 contained in a user profile of the first user 101 and based on harvested metadata associated with the first user 101, the canceller 165 may be able to determine which portion of the audio stream correlates to the speech of the first user 101. The user profile may be obtained from user database 156. Additionally, the canceller 165 may determine which portion of the audio stream correlates to the undesired background music outputted by the audio device 205. Furthermore, based on a music identifier 207 that identifies or matches information in the undesired music, the canceller 165 may determine which portion of the audio stream corresponds to the undesired music. The music identifier 207 may be stored and retrieved from the music database 157. Once the music is recognized and separated from the speech of the first user 101, the canceller 165 may cancel the music from the audio stream by utilizing the metadata and a noise profile including cancellation information for the music in conjunction with noise suppression algorithms, echo-cancellation techniques, and other similar cancellation procedures. In certain embodiments, the noise suppression may be performed solely by the canceller 165 and using cloud-computing resources, however, in other embodiments, the first user device 102 or other selected devices in the system 100 may assist in the cancellation process. Once the music is cancelled from the audio stream, the audio stream including the speech of the first user 101 may be transmitted to the second user device 111 of the second user 110 and to the automatic speech recognition system 175. Thus, the quality of the audio stream transmitted to the second user device 111 and to the automatic speech recognition system will be noticeably higher using the process described above.

Figure 3:
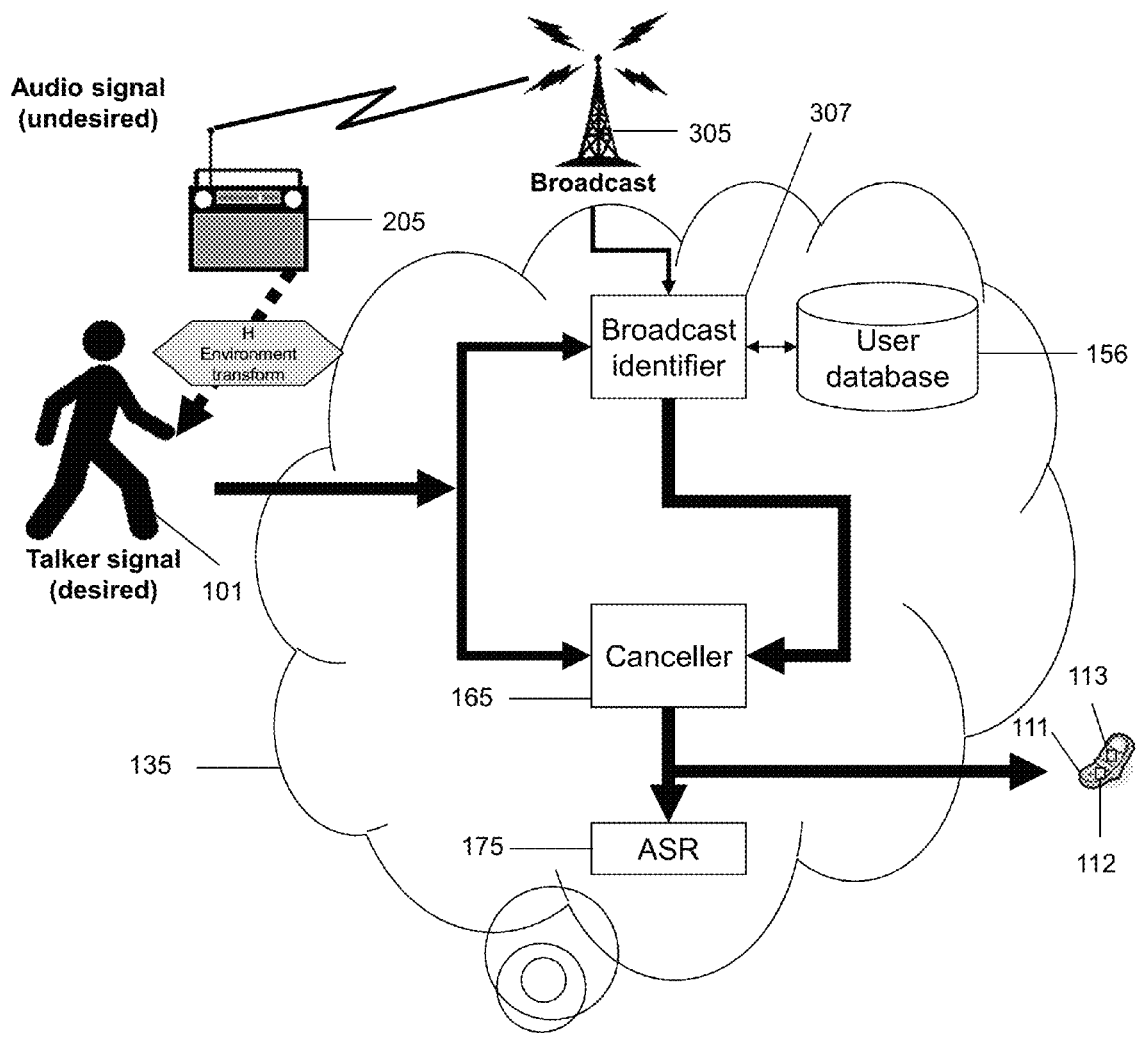
FIG. 3 is a schematic diagram illustrating a second sample scenario for using the system of FIG. 1 to cancel broadcast audio signals and content according to an embodiment of the present disclosure.

In a third example scenario, as shown in FIG. 3, the first user 101 of the first user device 102 may be engaged in a communications session with the second user 110, who is using second user device 111. As in the previous example, the first user 101 may also be engaged in a speech recognition session with the automatic speech recognition system 175. In this example, an audio device 205 may be a potential interferer that broadcasts audio signals received from a broadcast device 305, such as a radio station or other similar device capable of transmitting broadcast data including, but not limited to, AM, FM, digital, satellite, or high definition radio. As the first user 101 speaks and prior to transmitting the speech to its intended destinations, the first user's 101 speech, along with any undesired broadcast audio outputted by the audio device 205 while the first user 101 is speaking, may be transmitted to the communications network 135 in an audio stream to be processed using the cloud-computing resources of the communications network 135.

In this example, the system 100 may have metadata, noise profiles, and other information corresponding to the broadcast audio signals transmitted from the broadcast device 305. The metadata, noise profiles, and other information may be utilized to recognize, in real-time, the broadcast audio signals in the audio stream. The broadcast device 305 and the broadcast signals may also be recognized based on a broadcast identifier 307 that contains information that matches information contained in the broadcast signals. In certain embodiments, the system 100 may be able to distinguish between broadcast signals received-over-the-air versus broadcast signals obtained via web-based sources, such as web feeds. Additionally, based on speech characteristics correlating to the first user 101 contained in a user profile of the first user 101 and based on harvested metadata associated with the first user 101, the system 100 may be able to determine which portion of the audio stream correlates to the speech of the first user 101. The canceller 165 may then cancel the undesired broadcast signals from the audio stream by utilizing the metadata and/or a noise profile including cancellation information for the broadcast signals in conjunction with noise suppression algorithms, echo-cancellation techniques, and other similar cancellation procedures. Once the broadcast signals are cancelled from the audio stream, the audio stream including the speech of the first user 101 may be transmitted to the second user device 111 of the second user 110 and to the automatic speech recognition system 175.

Figure 4:
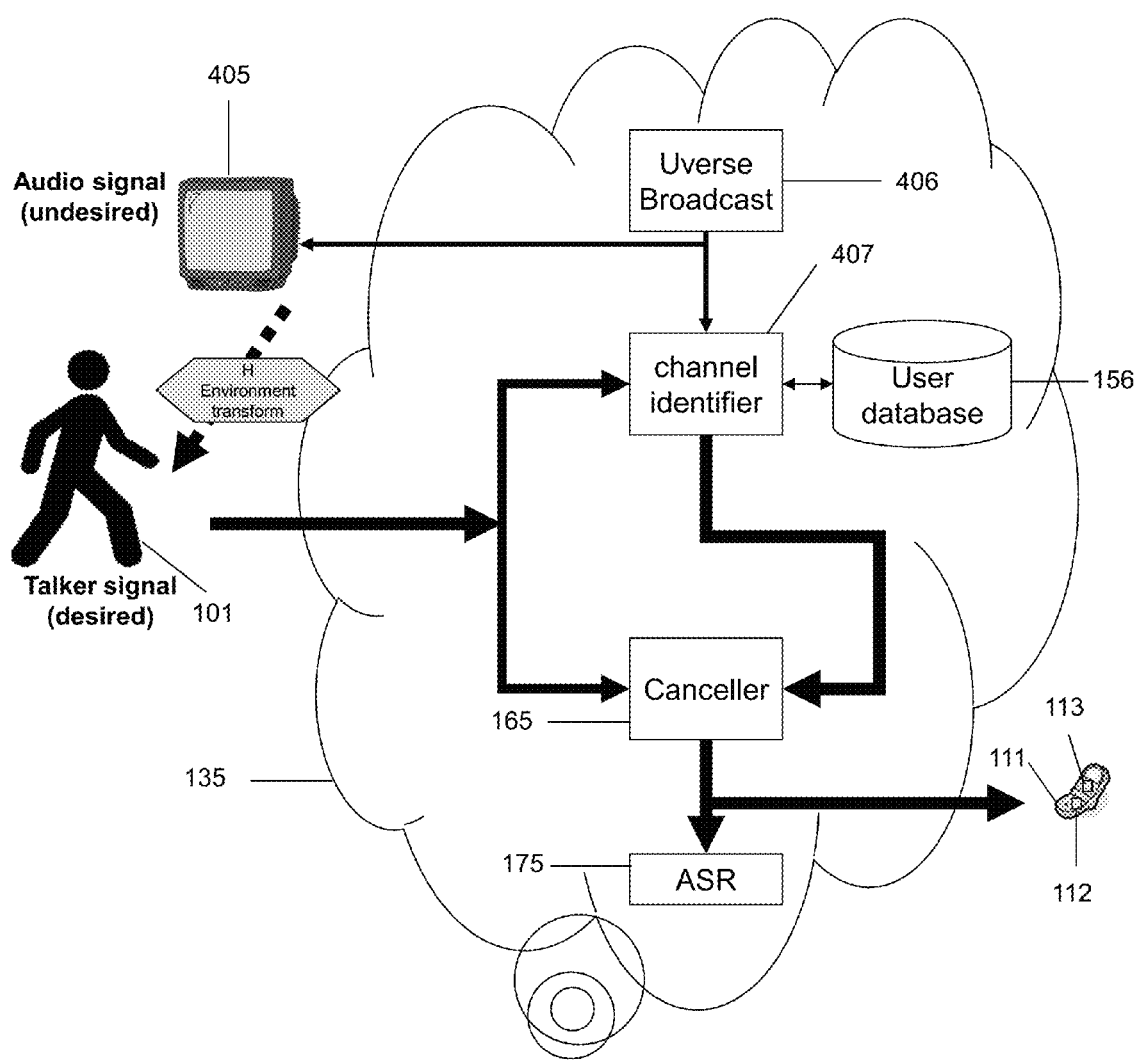
FIG. 4 is a schematic diagram illustrating a third sample scenario for using the system of FIG. 1 to cancel interactive television media signals and content according to an embodiment of the present disclosure.

In a fourth example scenario, as shown in FIG. 4, the first user 101 of the first user device 102 may be engaged in a communications session with the second user 110, who is using second user device 111. As in the previous examples, the first user 101 may also be engaged in a speech recognition session with the automatic speech recognition system 175. In this example, television device 405 may be a potential interferer that outputs television audio signals associated with media programming playing on the television device 405. As the first user 101 speaks and prior to transmitting the speech to its intended destinations, the first user's 101 speech, along with any undesired television audio signals outputted by the television device 405 while the first user 101 is speaking, may be transmitted to the communications network 135 in an audio stream to be processed using the cloud-computing resources of the communications network 135.

In this example, the system 100 may have metadata, noise profiles, and other information corresponding to the television audio signals transmitted from the television device 405. The metadata, noise profiles, and other information may be utilized to recognize, in real-time or beforehand, the television audio signals contained in the audio stream. The television audio signals may be recognized beforehand, particularly when the media programming containing the television audio signals is controlled by the provider controlling the communications network 135. The television device 405 and the television signals may also be recognized based on a channel identifier 407 and media programming broadcast information 406 that contains information that matches at least a portion of the information contained in the television audio signals. Additionally, based on speech characteristics of the first user 101 contained in a user profile of the first user 101 and based on harvested metadata associated with the first user 101, the system 100 may be able to determine which portion of the audio stream correlates to the speech of the first user 101. The canceller 165 may then cancel the undesired television audio signals from the audio stream by utilizing the metadata and/or a noise profile including cancellation information for the television audio signals in conjunction with noise suppression algorithms, echo-cancellation techniques, and other similar cancellation procedures. Once the television audio signals are cancelled from the audio stream, the audio stream including the speech of the first user 101 may be transmitted via an acoustic transmission channel to the second user device 111 of the second user 110 and/or to the automatic speech recognition system 175.

Figure 5:
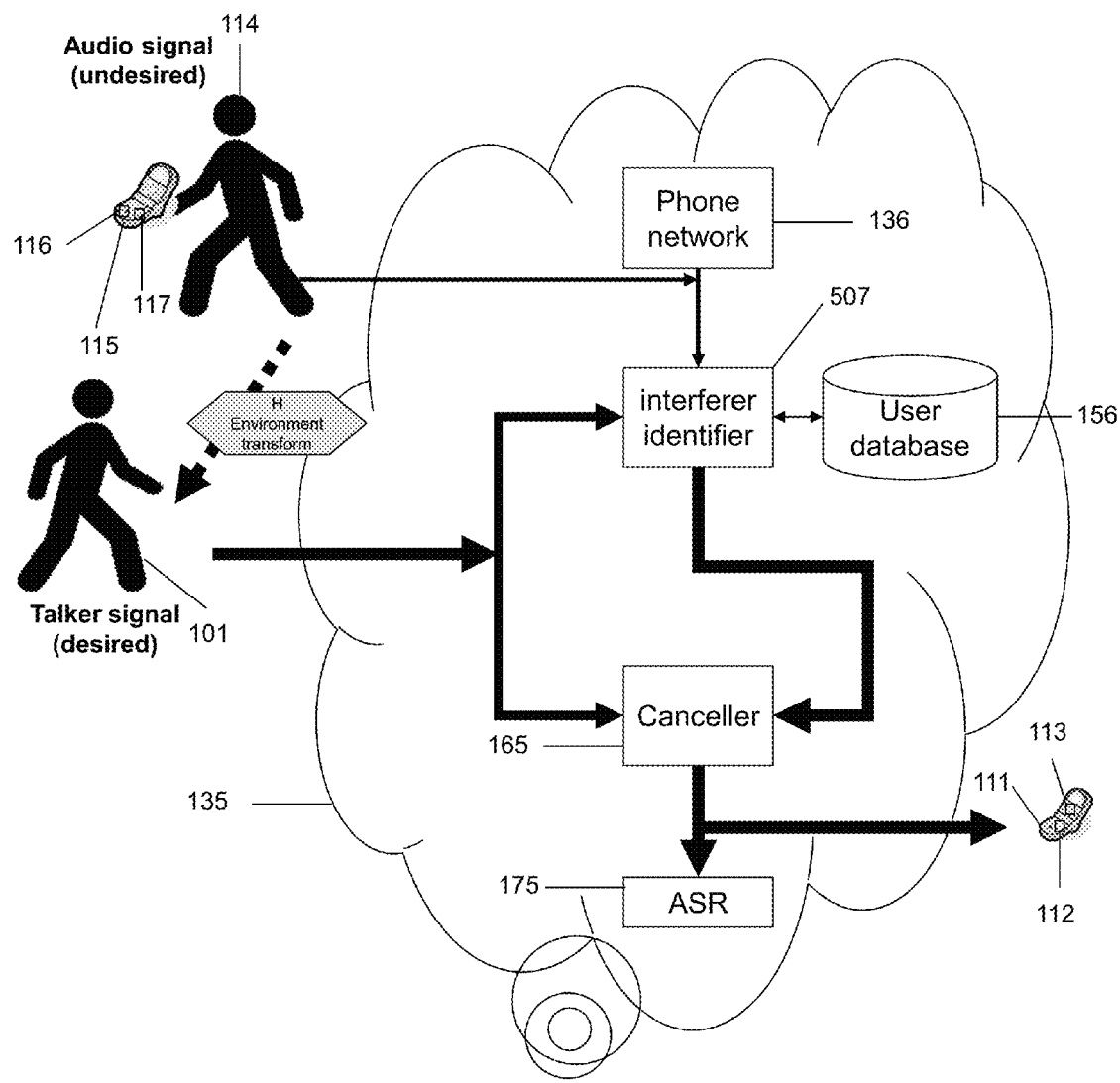
FIG. 5 is a schematic diagram illustrating a fourth sample scenario for using the system of FIG. 1 to cancel audio signals generated by an interfering user according to an embodiment of the present disclosure.
Figure 6:
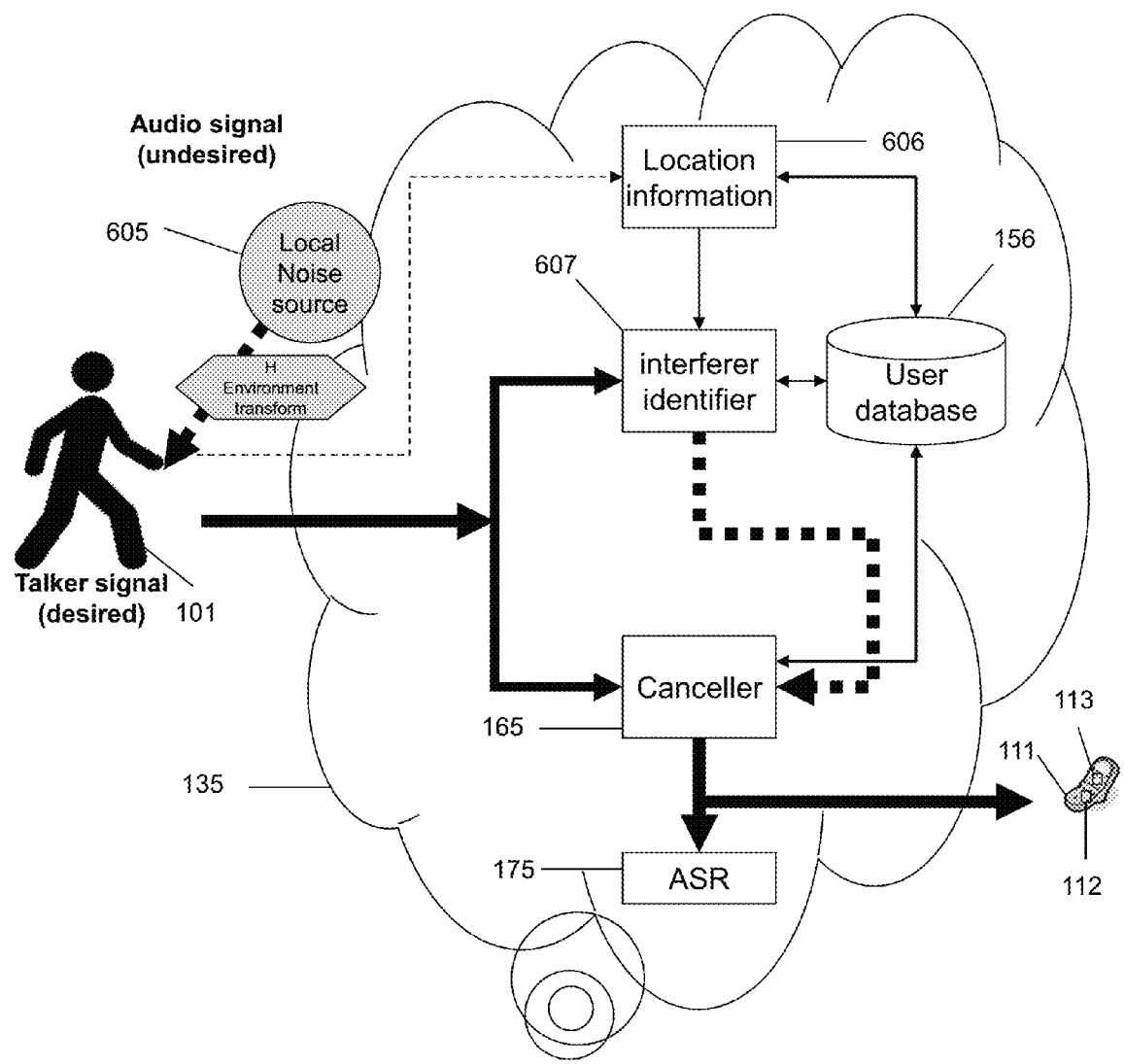
FIG. 6 is a schematic diagram illustrating a fifth sample scenario for using the system of FIG. 1 to cancel environmental and location-based audio signals according to an embodiment of the present disclosure.

In a fifth example scenario, as shown in FIG. 5, the first user 101 of the first user device 102 may be engaged in a communications session with the second user 110, who is using second user device 111. As in the previous examples, the first user 101 may also be engaged in a speech recognition session with the automatic speech recognition system 175. In this example, interferer 114 may be a potential interferer that is speaking aloud while using interfering device 115, and the interferer 114 may be located in the same environment 108 as the first user 101. As the first user 101 speaks and prior to transmitting the first user's 101 speech to its intended destinations, the first user's 101 speech, along with any speech of the interferer 114 and any audio signals outputted by the interfering device 115, may be transmitted to the communications network 135 in an audio stream to be processed using the cloud-computing resources of the communications network 135.

In this example, the system 100 may have metadata, noise profiles, and other information corresponding to the speech of the interferer 114 and the interfering device 115. This information may be obtained from the phone network 136, which may be the network that services both the first user's 101 phone calls and the interferer's 114 phone calls. The metadata, noise profiles, and other information may be utilized to recognize the speech of the interferer 114 and the audio signals outputted by the interfering device 115 contained in the audio stream. The interferer 114 may be recognized based on an interferer identifier 507 that contains information that matches information contained in the speech of the interferer 114, and/or based on a noise profile associated with the interferer 114. The audio signals outputted by the interfering device 115 may similarly be recognized based on a noise profile containing information correlating with the information contained in the audio signals outputted by the interfering device 115. Additionally, based on speech characteristics of the first user 101 contained in a user profile of the first user 101 and based on harvested metadata associated with the first user 101, the system 100 may be able to determine which portion of the audio stream corresponds to the speech of the first user 101. Notably, the first user's 101 information and the intefferer's 114 information may be anonymized from each other or other systems using the cloud-computing resources of the communications network 135.

After detecting the speech of the interferer 114 and the interfering device 115 audio signals, the canceller 165 may then cancel the undesired speech of the interferer 114 and the interfering device 115 audio signals from the audio stream by utilizing the metadata and/or noise profiles including cancellation information for the speech and audio signals in conjunction with noise suppression algorithms, echo-cancellation techniques, and other similar cancellation procedures. Once the interferer's 114 speech and interfering device 115 audio signals are cancelled from the audio stream, the audio stream including the speech of the first user 101 may be transmitted via an acoustic transmission channel to the second user device 111 of the second user 110 and/or to the automatic speech recognition system 175. Notably, metadata and user profiles for the first user 101, the interferer 114, and the interfering device 115 may be updated based on the audio stream and based on the cancellation process.

In a sixth example scenario, the first user 101 of the first user device 102 may be engaged in a communications session with the second user 110, who is using second user device 111. As in the previous examples, the first user 101 may also be engaged in a speech recognition session with the automatic speech recognition system 175. In this example, a local noise source 605, located in the same environment 108 as the first user 101, may be generating interfering audio signals that may potentially interfere with the first user's 101 communications. As the first user 101 speaks and prior to transmitting the first user's 101 speech to its intended destinations, the first user's 101 speech, along with the interfering audio signals outputted by the local noise source 605, may be transmitted to the communications network 135 in an audio stream to be processed using the cloud-computing resources of the communications network 135.

In this example, the system 100 may have metadata, noise profiles, and other information corresponding to the interfering signals outputted by the local noise source 605. The metadata, noise profiles, and other information may be utilized to recognize, in real-time or beforehand, the interfering signals contained in the audio stream. The interfering signals and local noise source 605 may also be recognized based on an interferer identifier 607 and location information 606 that contains information that matches information contained in the interfering audio signals and information associated with the local noise source 605. Additionally, based on speech characteristics of the first user 101 contained in a user profile of the first user 101 and based on harvested metadata associated with the first user 101, the system 100 may be able to determine which portion of the audio stream corresponds to the speech of the first user 101. The canceller 165 may then cancel the undesired interference signals from the audio stream by utilizing the metadata and/or a noise profile including cancellation information for the interference signals in conjunction with noise suppression algorithms, echo-cancellation techniques, and other similar cancellation procedures. Once the interference signals from the local noise source 605 are cancelled from the audio stream, the audio stream including the speech of the first user 101 may be transmitted via an acoustic transmission channel to the second user device 111 of the second user 110 and/or to the automatic speech recognition system 175.

Notably, as shown in FIG. 1, the system 100 may perform any of the operative functions disclosed herein by utilizing the processing capabilities of server 160, the storage capacity of the databases 155, 156, 157, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, receiving the audio streams associated with the first and second users 101, 110, determining if the audio stream includes an interference signal, analyzing the audio streams based on metadata, cancelling the interference signals, transmitting the audio streams after performing the cancellation of the interference signals, determining the environment 108 of the first and second users 101, 110, obtaining usage patterns for the first and second users 101, 110, obtaining sensor data, identifying acoustic parameters based on the sensor data, and performing any other suitable operations conducted in the system 100 or otherwise. In one embodiment, multiple servers 160 may be utilized to process the functions of the system 100. The server 160 and other devices in the system 100, may utilize the databases 155, 156, 157 for storing data about the devices in the system 100 or any other information that is associated with the system 100. In one embodiment, multiple databases 155, 156, 157 may be utilized to store data in the system 100.

Although FIGS. 1-6 illustrate specific example configurations of the various components of the system 100, the system 100 may include any configuration of the components, which may include using a greater or lesser number of the components. For example, the system 100 is illustratively shown as including a first user device 102, a second user device 111, a interferer 114, an interfering device 115 a interferer 125, communications network 135, a phone network 136, a server 140, a server 145, a server 150, a server 160, a database 155, a user database 156, a music database 157, a canceller 165, an automatic speech recognition system 175, an audio device 205, a broadcasting device 305, a television device 405, and a local noise source 605. However, the system 100 may include multiple first user devices 102, multiple second user devices 111, multiple interferers 114, 125, multiple interfering devices 115, multiple communications networks 135, multiple phone networks 136, multiple servers 140, 145, 150, and 160, multiple databases 155, 156, 157, multiple cancellers 165, multiple automatic speech recognition systems 175, multiple audio devices 205, multiple broadcasting devices 305, multiple television devices 405, multiple local noise sources 605, or any number of any of the other components in the system 100. Furthermore, in certain embodiments, substantial portions of the functionality and operations of the system 100 may be performed by other networks and systems that may be connected to system 100.

Figure 7:
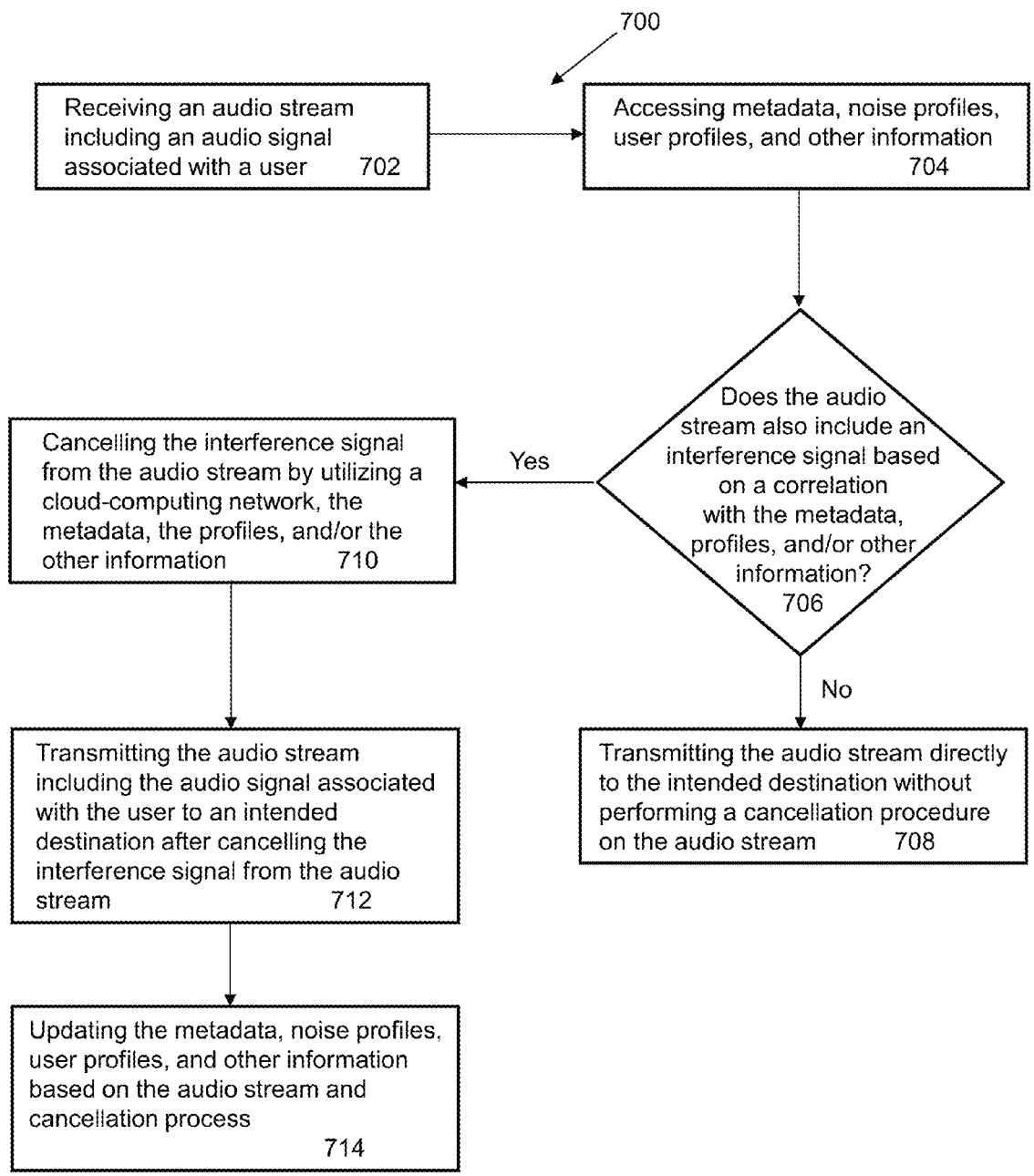
FIG. 7 is a flow diagram illustrating a sample method for providing cloud acoustic enhancement according to an embodiment of the present disclosure.

As shown in FIG. 7, an exemplary method 700 for providing cloud acoustic enhancement is schematically illustrated, and may include, at step 702, receiving an audio stream including a desired audio signal associated with a user, such as first user 101. For example, the audio stream may be a voice communication, a music communication, or any other type of audio communication received from first user 101 via the first user device 102. The communication may be intended to be sent to the second user device 111 of the second user 110, to the automatic speech recognition system 175, to any other desired destination, or any combination thereof. In certain embodiments, the receiving of the audio stream may be performed by the canceller 165, the servers 140, 145, 150, 160, the databases 155, 156, 157, any combination thereof, or by any other appropriate device. Once the audio stream is received, the method 700 may include, at step 704, accessing metadata, user profiles, noise profiles, sensor, data, or any other information to assist in determining if interference signals also exist in the received audio stream. In certain embodiments, the metadata, user profiles, noise profiles, sensor data, or any other information may be accessed from database 155, user database 156, music database 157, any combination thereof, or by any other appropriate device. In addition to accessing the metadata, profiles, and data, from databases 155, 156, 157, additional metadata and data may be harvested in real-time from any of the devices in the system or from any of the signals traversing the system 100.

After accessing and harvesting the metadata, user profiles, noise profiles, sensor, data, or any other information, the method 700 may include, at step 706, determining whether the audio stream includes an interference signal. The audio stream may be determined to include an interference signal if a portion of the audio stream correlates with the metadata, user profiles, noise profiles, sensor data, or any other information that identifies the interference signal as such. In certain embodiments, the determination as to whether the audio stream includes the interference signal may be performed by the canceller 165, the first user device 102, the servers 140, 145, 150, 160, any combination thereof, or by any other appropriate device. If the audio stream is determined to not include an interference signal, the method 700 may include, at step 708, transmitting the audio stream directly to the intended destination. For example, if the intended destination is the second user device 111 or the automatic speech recognition system 175, the audio stream may be directly sent to such destinations. In certain embodiments, the audio stream may be transmitted by utilizing the canceller 165, the first user device 102, the servers 140, 145, 150, 160, any combination thereof, or by any other appropriate device.

If, however, the audio stream is determined to include the interference signal, the method 700 may include, at step 710, cancelling, or otherwise suppressing, the interference signal from the audio stream. The interference signal may be cancelled by utilizing the cloud-computing resources of the communications network 135, the metadata, the user profiles, the noise profiles, the sensor data, or any other information in conjunction with noise suppression and cancellation algorithms and techniques. In certain embodiments, the interference signal may be canceled by utilizing the canceller 165, the first user device 102, the servers 140, 145, 150, 160, any combination thereof, or by any other appropriate device. Once the interference signal is cancelled or otherwise suppressed, the method 700 may include, at step 712, transmitting the audio stream including the desired audio signal associated with the user to an intended destination. The audio stream, for example, may be transmitted to the second user device 111, the automatic speech recognition system 175, or to any other intended destination. In certain embodiments, the audio stream may be transmitted by utilizing the canceller 165, the first user device 102, the servers 140, 145, 150, 160, any combination thereof, or by any other appropriate device.

At step 714, the method 700 may include updating the metadata, the noise profiles, the user profiles, the sensor data, or any other information based on the audio stream, based on the cancellation process, based on the devices in the system 100, or any combination thereof. It is important to note that the methods described above may incorporate any of the functionality, devices, and/or features of the system 100 and subsystems described above, or otherwise, and are not intended to be limited to the description or examples provided herein.

Notably, the system 100 and methods disclosed herein may include additional functionality and features. In certain embodiments, the visual, audio, and other information may be obtained by utilizing any type of sensor, such as, but not limited to, any visual sensor, any acoustic sensor, any recording device, any light sensor, any other type of sensor, or a combination thereof. Additionally, information and metadata may be obtained by using visual information captured by the camera 105, acceleration data captured by the accelerometer 106, orientation data captured using the gyroscope 109, and location data captured by the global positioning sensor 107. Supplemental information from such sensors may be utilized to identify or refine, locally or in concert with cloud-based network resources, acoustic parameters that may be useful in subsequent processing of the audio streams. For example, the orientation of the first user device 102 may be obtained from metadata obtained from the accelerometer 106. As an example, the orientation and placement of the first user device 102 on a surface may potentially impact the acoustic performance of the first user device 102 in predictable ways, and may assist in subsequent processing of audio streams associated with the first user device 102.

In certain embodiments, the cloud-computing resources of the communications network 135 may be utilized to collect and gather historical usage patterns associated with the first user 101, the second user 110, the interferer 114, or other users to augment the noise cancellation process. For example, if the first user 101 commutes daily by car while listening to a selected radio station, this information may be transmitted into the communications network 135 so as to enhance the responses time and performance of noise cancellation processing when the first user 101 takes calls from his car.

Similarly, historical data about the acoustic environments 108 that the first user 101 is located in, such as a night club or an outdoors area, may be utilized to enhance the performance of the noise cancellation process. The noise profiles of such environments 108 may be radically different from one another, and identifying them may assist in mitigating the deleterious effects of background noise on automatic speech recognition performance or various types of communications sessions. Additionally, in certain embodiments, using the system 100 to determine whether the first user 101 is positioned in a moving vehicle, such as a bike, car, airplane, or train, may assist in mitigating the effects of interference. Each mode of transportation may have a corresponding noise profile, and, as a result, some of the interference signals associated with such modes of transportation may be predictable. Therefore, such information may be helpful in cancelling noises associated with such modes of transportation.

Figure 8:
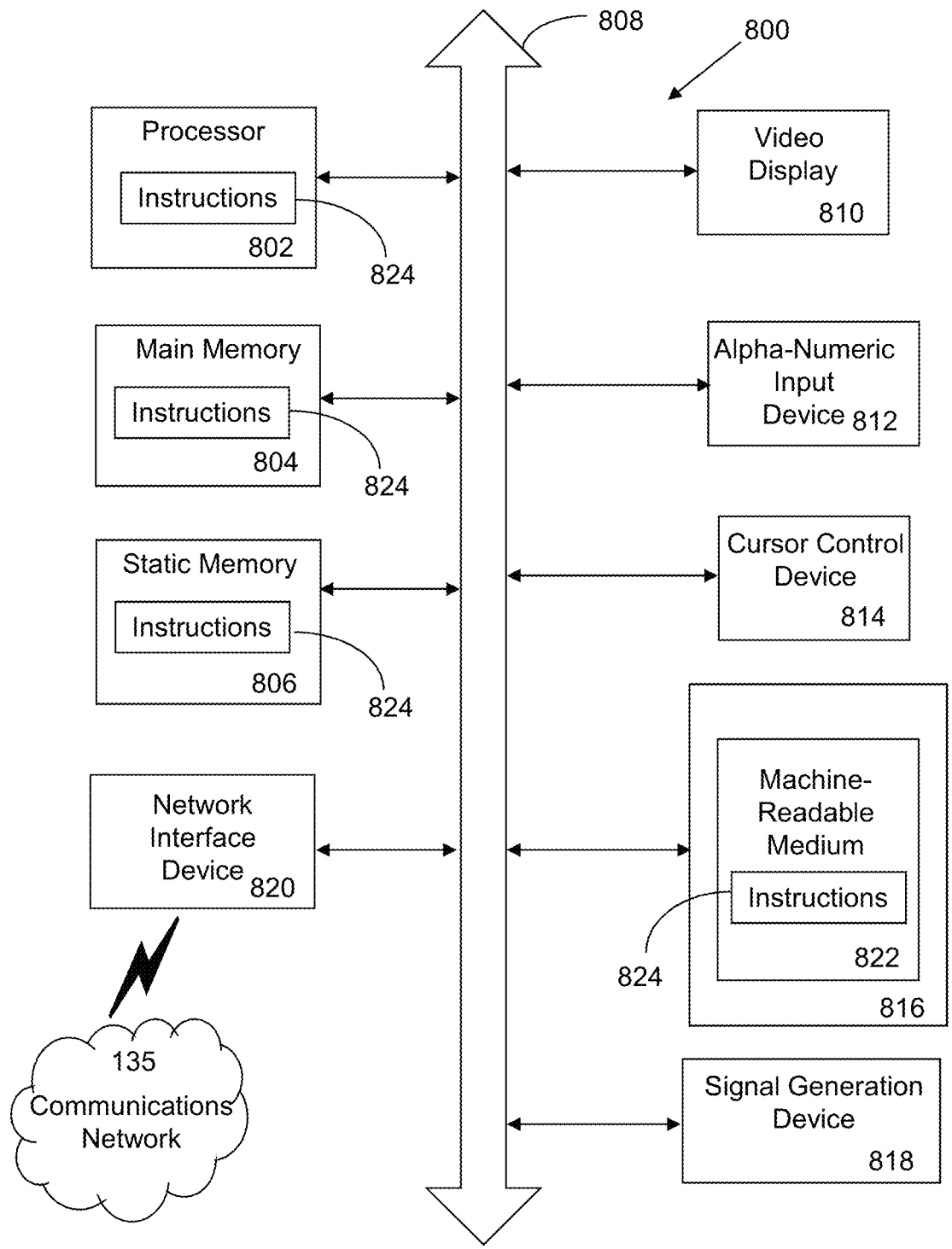
FIG. 8 is a schematic diagram of a machine in the form of a computer system within which a set of instructions, when executed, may cause the machine to perform any one or more of the methodologies or operations of the systems and methods for providing cloud acoustic enhancement.

Referring now also to FIG. 8, at least a portion of the methodologies and techniques described with respect to the exemplary embodiments of the system 100 can incorporate a machine, such as, but not limited to, computer system 800, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 135, another network, or a combination thereof) to and assist with operations performed by other machines and systems, such as, but not limited to, the first user device 102, the second user device 111, the server 140, the server 145, the server 150, the database 155, the user database 156, the music database 157, the server 160, the canceller 165, the automatic speech recognition system 175, the audio device 205, the broadcast device 305, the television device 405, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810, which may be, but is not limited to, a liquid crystal display (LCD), a flat panel, a solid state display, or a cathode ray tube (CRT). The computer system 800 may include an input device 812, such as, but not limited to, a keyboard, a cursor control device 814, such as, but not limited to, a mouse, a disk drive unit 816, a signal generation device 818, such as, but not limited to, a speaker or remote control, and a network interface device 820.

The disk drive unit 816 may include a machine-readable medium 822 on which is stored one or more sets of instructions 824, such as, but not limited to, software embodying any one or more of the methodologies or functions described herein, including those methods illustrated above. The instructions 824 may also reside, completely or at least partially, within the main memory 804, the static memory 806, or within the processor 802, or a combination thereof, during execution thereof by the computer system 800. The main memory 804 and the processor 802 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 822 containing instructions 824 so that a device connected to the communications network 135, the phone network 136, other network, or a combination thereof, can send or receive voice, video or data, and to communicate over the communications network 135, the phone network 136, other network, or a combination thereof, using the instructions. The instructions 824 may further be transmitted or received over the communications network 135, the phone network 136, other network, or a combination thereof, via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device, or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system, comprising:
   a memory that stores instructions;
   a processor that executes the instructions to perform operations, the operations comprising:
   receiving an audio stream;
   determining if the audio stream includes an interference signal, wherein the audio stream is determined to include the interference signal if a first portion of the audio stream correlates with metadata that identifies the interference signal;
   determining that a second portion of the audio stream includes an audio signal associated with a user based on detecting a speech pattern corresponding to the user in the audio stream;
   obtaining orientation data corresponding to a device of the user;
   cancelling, if the audio stream is determined to include the interference signal, the interference signal from the audio stream, wherein the interference signal is cancelled from the audio stream by utilizing the metadata, the orientation data, and a location of an interferer utilizing an interfering device that outputted the interference signal, wherein the interference signal is cancelled based on a noise profile identifying a type of the interfering device that outputted the interference signal and indicating a pattern of usage of the interfering device by the interferer utilizing the interfering device; and
   transmitting, after cancelling the interference signal, the audio stream including the audio signal associated with the user to an intended destination.

2. The system of claim 1, wherein the operations further comprise determining an environment associated with the user based on the audio stream including audio information correlating with a noise profile for the environment.

3. The system of claim 2, wherein the operations further comprise cancelling the interference signal based on the noise profile for the environment.

4. The system of claim 1, wherein the operations further comprise obtaining a usage pattern associated with the device of the user, and wherein the operations further comprise cancelling the interference signal based on the usage pattern.

5. The system of claim 1, wherein the operations further comprise determining that the audio stream includes the interference signal if the first portion of the audio stream correlates with an interferer identifier associated with the metadata.

6. The system of claim 1, wherein the operations further comprise obtaining sensor data from a sensor of the device associated with the user.

7. The system of claim 6, wherein the operations further comprise identifying an acoustic parameter based on the sensor data, and wherein the operations further comprise cancelling the interference signal by utilizing the acoustic parameter.

8. The system of claim 1, wherein the operations further comprise transmitting the audio stream to an automated speech recognition system after cancelling the interference signal.

9. The system of claim 1, wherein the operations further comprise enabling the device associated with the user to assist in cancelling the interference signal.

10. A method, comprising:
    receiving an audio stream;
    determining, by utilizing instructions from memory that are executed by a processor, if the audio stream includes an interference signal, wherein the audio stream is determined to include the interference signal if a first portion of the audio stream correlates with metadata that identifies the interference signal;

determining that a second portion of the audio stream includes an audio signal associated with a user based on detecting a speech pattern corresponding to the user in the audio stream;

obtaining orientation data corresponding to a device of the user;

cancelling, if the audio stream is determined to include the interference signal, the interference signal from the audio stream, wherein the interference signal is cancelled from the audio stream by utilizing the metadata, the orientation data, and a location of an interferer utilizing an interfering device that outputted the interference signal, wherein the interference signal is cancelled based on a noise profile identifying a type of the interfering device that outputted the interference signal and indicating a pattern of usage of the interfering device by the interferer utilizing the interfering device; and transmitting, after cancelling the interference signal, the audio stream including the audio signal associated with the user to an intended destination.

11. The method of claim 10, further comprising determining an environment associated with the user based on the audio stream including audio information correlating with a noise profile for the environment.

12. The method of claim 11, further comprising cancelling the interference signal based on the noise profile for the environment.

13. The method of claim 10, further comprising obtaining a usage pattern associated with the device of the user, and further comprising cancelling the interference signal based on the usage pattern.

14. The method of claim 10, further comprising determining that the audio stream includes the interference signal if the first portion of the audio stream correlates with an interferer identifier in the metadata.

15. The method of claim 10, further comprising obtaining sensor data from a sensor of the device associated with the user.

16. The method of claim 15, further comprising identifying an acoustic parameter based on the sensor data, and further comprising cancelling the interference signal by utilizing the acoustic parameter.

17. The method of claim 10, further comprising transmitting the audio stream to an automated speech recognition system after cancelling the interference signal.

18. The method of claim 10, further comprising enabling the device associated with the user to assist in cancelling the interference signal.

19. The method of claim 10, further comprising adjusting a user profile associated with the user based on the metadata and based on information associated with the interference signal.

20. A computer-readable device comprising instructions, which when executed by a processor, cause the processor to perform operations comprising:

receiving an audio stream;

determining if the audio stream includes an interference signal, wherein the audio stream is determined to include the interference signal if a first portion of the audio stream correlates with metadata that identifies the interference signal;

determining that a second portion of the audio stream includes an audio signal associated with a user based on detecting a speech pattern corresponding to the user in the audio stream;

obtaining orientation data corresponding to a device of the user;

cancelling, if the audio stream is determined to include the interference signal, the interference signal from the audio stream, wherein the interference signal is cancelled from the audio stream by utilizing the metadata, the orientation data, and a location of an interferer utilizing an interfering device that outputted the interference signal, wherein the interference signal is cancelled based on a noise profile identifying a type of the interfering device that outputted the interference signal and indicating a pattern of usage of the interfering device by the interferer utilizing the interfering device; and transmitting, after cancelling the interference signal, the audio stream including the audio signal associated with the user to an intended destination.

* * * * *